(12) United States Patent
Yeo

(10) Patent No.: US 7,242,530 B2
(45) Date of Patent: Jul. 10, 2007

(54) ULTRA WIDE ANGLE ZOOM LENS IN PROJECTION DISPLAY SYSTEM

(75) Inventor: Sang Ok Yeo, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/980,962

(22) Filed: Nov. 3, 2004

(65) Prior Publication Data

US 2005/0094287 A1    May 5, 2005

(30) Foreign Application Priority Data

Nov. 5, 2003    (KR) ...................... 10-2003-0077971

(51) Int. Cl.
*G02B 15/14*    (2006.01)
*G02B 9/04*    (2006.01)

(52) U.S. Cl. ........................ 359/682; 359/651; 359/679

(58) Field of Classification Search ................ 359/651, 359/679, 680, 681, 682
See application file for complete search history.

(56) References Cited

U.S. PATENT DOCUMENTS 5,442,484 A * 8/1995 Shikawa ...................... 359/651
5,671,993 A * 9/1997 Shikama ........................ 353/77
5,745,297 A * 4/1998 Kaneko et al. ............. 359/651
6,760,162 B2 * 7/2004 Yeo ............................ 359/651

* cited by examiner

*Primary Examiner*—David N. Spector
(74) *Attorney, Agent, or Firm*—Lee, Hong, Degerman, Kang & Schmadeka

(57) ABSTRACT

An ultra wide angle zoom lens for a projection display system including a liquid crystal panel displaying an image; a second lens group having a positive refractive power, formed by combination of two or more lenses, and correcting chromatic and spherical aberrations of incident light from the liquid crystal panel; a total reflection mirror reflecting the incident light from the second lens group in a predetermined direction; and a first lens group having a negative refractive power, formed by combination of two or more lenses, and correcting distortion and astigmatism of the incident light from the total reflection mirror. Here, a projection lens is constructed so that a magnification of the projection lens is adjusted by movement of the second lens group along an optical axis, and the first lens group is moved forward and backward according to the adjusted magnification of the projection lens so that lens focusing can be adjusted.

18 Claims, 12 Drawing Sheets

ULTRA WIDE ANGLE ZOOM LENS IN PROJECTION DISPLAY SYSTEM

This application claims the benefit of Korean Application No. P2003-0077971, filed on Nov. 5, 2003, which is hereby incorporated by reference.

BACKGROUND OF TH INVENTION

1. Field of the Invention

The present invention relates to a projection optical system, and more particularly, to an ultra wide angle zoom lens for a rear projection television (TV), which can be used in all fields irrespective of a thickness and display screen size of a TV system.

2. Discussion of the Related Art

Recently, with the increase in demand for large-size screens and high-definition images, projection systems that enlarge and project small images using a projection lens have gained popularity. The projection systems are roughly classified into a front projection system and a rear projection system depending on a direction of an image projected on a screen. The rear projection system has received much attention due to its advantageous ability of displaying relatively bright images even in bright surroundings.

An example of the rear projection system includes a projection TV. In the projection TV, a cathode ray tube (CRT) mode has been mainly used as a light source for displaying small images. However, it is difficult to construct a slim-size projection TV having the CRT mode due to a size of the CRT. For this reason, it is difficult to provide a large-size screen, a slim depth and the luminance required for high resolution in the projection TV.

To solve such problems, a projection TV based on a flat display, that can provide a large-size screen at a thin thickness, has been suggested.

Examples of the flat display include a liquid crystal display (LCD), a plasma display panel (PDP), a field emission display (FED), and an electro-luminescence (EL) device.

Among them, the projection TV using the LCD projects light emitted from a light source onto the LCD and displays an image of a liquid crystal panel on a screen using a projection lens system. Since the image is enlarged and projected on the screen using the liquid crystal panel of high image quality and a small size, a large-size screen image can be easily provided along with a slim-sized projection system. Moreover, the projection display system based on a liquid crystal panel can provide relatively high resolution and high luminance compared to the CRT. Therefore, a large-sized screen can be provided.

The projection display system based on a liquid crystal panel includes an optical engine, a total reflection mirror and a screen. The optical engine includes an illuminating system, a liquid crystal panel and a projection lens system.

In the projection display system, the illuminating system generates light and irradiates the generated light onto the liquid crystal panel. The liquid crystal panel displays an image by controlling transmissivity of incident light from the lighting system in accordance with an image signal. The projection lens system enlarges and projects the image from the liquid crystal panel and displays the image on the screen, thereby enabling a viewer to view the image displayed on a screen.

In this case, the image projected by the projection lens system is totally reflected by the total reflection mirror to change a light path. The image reflected by the total reflection mirror moves through the changed light path to the screen and then is displayed on the screen. If the projected image is directly projected from the rear of the screen without any change of the light path by the total reflection mirror, the thickness of the system becomes great. Accordingly, it is desirable to change the light path using the total reflection mirror so as to reduce the thickness of the system.

FIG. 1 is a schematic diagram illustrating a related art projection display system based on a liquid display panel.

Referring to FIG. 1, the related art projection display system includes an illuminating system, a liquid crystal panel and a projection lens system. The illuminating system includes a light source having an elliptical or parabolic reflection mirror 10 and a lamp 12, first and second fly eye lenses (FEL) 22 and 24, a polarizing beam splitter array (PBS array) 26 and a condensing lens 28 arranged between the light source 12 and a first dichroic mirror 30. The liquid crystal panel includes dichroic mirrors 30 and 34 and total reflection mirrors 32, 38 and 42. The projection lens system includes a dichroic prism 46 and a projection lens 48. Additionally, the projection display system further includes first and second relay lenses 36 and 40, Red/Green/Blue (RGB) liquid crystal panels 44R, 44G and 44B, and a screen 50.

An operation of the projection display system will now be described in detail with reference to FIG. 1.

Referring again to FIG. 1, visible lights emitted from the lamp 12 are reflected by the elliptical or parabolic reflection mirror 10 and move to the first FEL 22. The first FEL 22 divides incident lights on a cell basis and focuses the divided lights upon respective cells of the second FEL 24. The second FEL 24 converts incident lights into parallel lights and sends them to the PBS array 26. The PBS array 26 splits incident lights into linearly polarized lights having the same axis, namely a P-wave and an S-wave, and then converts the P-wave into an S-wave by a wavelength plate attached partially on its rear surface.

Accordingly, incident lights are all converted into linearly polarized lights of one direction, namely S-waves, whereby nearly all the lights emitted from the light source are inputted to the RGB liquid crystal panels 44R, 44G and 44B. At this time, the condensing lens 28 condenses lights outputted from the PBS array 26 to the liquid crystal panels 44.

The first and second dichroic mirrors 30 and 34 are arranged between the condensing lens 28 and the RGB liquid crystal panels 44R, 44G and 44B.

That is, the first total reflection mirror 32 and the red liquid crystal panel 44R are arranged to one side of the first dichroic mirror 30, and the second dichroic mirror 34 is arranged to another side of the first dichroic 30.

The green liquid crystal panel 44G is arranged to one side of the second dichroic mirror 34, and the first relay lens 36, the second total reflection mirror 38, the second relay lens 40, the third total reflection mirror 42 and the blue liquid crystal panel 44B are arranged to another side of the second dichroic mirror 34.

The dichroic prism 46 is arranged on three surfaces of the RGB liquid crystal panels 44R, 44G, and 44B, and the projection lens 48 and the screen 50 are arranged to the remaining side of the dichroic prism 46.

At this time, the total reflection mirror 32 totally reflects red light from the first dichroic mirror 30 to thereby transmit the reflected red light to the red liquid crystal panel 44R. Here, the red liquid crystal panel 44R is a transmissive LCD, which transmits the red light transmitted by the first total reflection mirror 32 to the dichroic prism 46.

Also, the second dichroic mirror 34 reflects a green light out of the lights having passed through the first dichroic mirror 30 while transmitting a blue light out of the lights having passed through the first dichroic mirror 30. Accordingly, the green light reflected by the second dichroic mirror 34 is transmitted to the green liquid crystal panel 44G. Here, the green liquid crystal panel 44G is a transmissive LCD, which transmits the green light transmitted by the second dichroic mirror 34 to the dichroic prism 46.

Also, the blue light having passed through the second dichroic mirror 34 is transmitted through the first relay lens 36, the second total reflection mirror 38, the second relay lens 40 and the third total reflection mirror 42 to the blue liquid crystal panel 44B. In this case, the first and second relay lenses 36 and 40 are field lenses, which delay a focus of the blue light prior to transmission of the blue light to the blue liquid crystal panel 44B. Here, the blue liquid crystal panel 44B is a transmissive LCD, which transmits the blue light transmitted by the third total reflection mirror 42 to the dichroic prism 46.

In this manner, the RGB liquid crystal panels 44R, 44G and 44B respectively reproduce a light image of each color by means of the received R, G and B lights in accordance to an image signal. In this case, an S-wave inputted to each of the RGB liquid crystal panels 44R, 44G and 44B is converted into a P-wave by each liquid crystal panel.

In this manner, the dichroic prism 46 combines received red, green and blue lights by using three-color image information from the RGB liquid crystal panels 44R, 44G and 44B. That is, the dichroic prism 46 reflects red and blue lights toward the projection lens 48 while transmitting a green light to the projection lens 48, thereby combining red, green and blue images.

Thereafter, the projection lens 48 enlarges the images from the dichroic prism 46 to then project the enlarged images on the screen 50.

The so-constructed projection display system can be small and lightweight.

Additionally, research for reducing the thickness of the projection display system while increasing its screen size, have been conducted. To make the size of the screen large and reduce the thickness of the system, it is necessary to decrease a projection distance between the screen 50 and the projection lens 48.

For this, the projection lens system includes a first lens group having a positive refractive power, and a second lens group having a negative refractive power. At this time, a total reflection mirror for changing the light path is disposed between the first lens group and the second lens group to form an "L" shaped projection lens system, whereby the thickness and the height of the system can be reduced.

However, in the "L" shaped projection lens system, the negative refractive power of the second lens group is great in order to obtain a short projection distance. Accordingly, aberrations such as distortion, coma, and astigmatism greatly occur.

SUMMARY OF THE INVENTION

Accordingly, the present invention is directed to a projection lens system of a projection display system that substantially obviates one or more problems due to limitations and disadvantages of the related art.

An object of the present invention is to provide a projection lens system of a projection display system, which can reproduce a clear picture while correcting aberrations.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an ultra wide angel zoom lens for a projection display system, includes: an optical engine comprising a liquid crystal panel for reproducing light generated by an illuminating system as an image according to an image signal; and a projection lens system comprising at least two lenses, enlarging the image transmitted from the optical engine and projecting the enlarged imaged on a screen by using the lenses, wherein one group of the lenses adjusts a lens magnification and the other group of the lenses adjusting lens focusing according to the adjusted lens magnification.

Preferably, a retro ratio (bf1/f1)(bfl/fl) for determining the size of the projection lens system installed between the optical engine and the screen is within 3.2 through 3.5, wherein 'bfl' is a distance between the optical engine and a second lens group and 'fl' is a total focal length of the projection lens system.

Preferably, the projection lens system includes: a second lens group arranged between the liquid crystal panel and the screen and having at least two lenses of a positive refractive power; a first lens group arranged between the second lens group and the screen and having at least two lenses of a negative refractive power; and a first total reflection mirror arranged between the first lens group and the second lens group so that an optical axis is 'L'-shaped.

Preferably, the second lens group includes: a first spherical lens positioned near the first total reflection mirror and having a positive refractive power; an aspherical lens positioned near the first spherical lens and having a positive refractive power; a doublet positioned near the aspherical lens, wherein a positive spherical lens is coupled with a negative spherical lens in the doublet; and a second spherical lens positioned near the doublet and having a positive refractive power.

Preferably, the first lens group includes: first and second convex lenses arranged near the screen and having a negative refractive power; an aspherical lens positioned near the first and second convex lenses; and a spherical lens positioned near the aspherical lens and having a positive refractive power.

Preferably, refractive powers of the first and second lens groups are determined so that a distance ratio of the first lens group to the second lens group is within 0.7 through 1.0.

Preferably, the first lens group and the second lens group are made of glass or plastics.

Preferably, a ratio (d8/fl) of a distance (d8) between the first total reflection mirror and the second lens group to a distance (fl) between the first total reflection mirror and the first lens group is within 5.0 through 7.0.

In another aspect of the present invention, an ultra wide angle zoom lens in a projection display system, includes: a liquid crystal panel displaying an image; a second lens group having a positive refractive power, formed by combination of two or more lenses, and correcting chromatic and spherical aberrations of incident light from the liquid crystal panel; and a total reflection mirror reflecting the incident light from the first lens group in a predetermined direction, a first lens group having a negative refractive power, formed by combination of two or more lenses, and correcting distortion and astigmatism of the incident light from the total reflection mirror, wherein a projection lens is constructed so that a magnification of the projection lens is adjusted by movement of the second lens group along an optical axis, and the first lens group is moved forward and backward according to the adjusted magnification of the projection lens so that a lens focusing can be adjusted, thereby satisfying the following equation:

$$3.2 < bfl/fl < 3.5;\ 0.75 < |f2/f1| < 1.0;\ \text{and}\ 5.0 < d8/fl < 7.0.$$

Here, bfl is a distance between the liquid crystal panel and the second lens group. fl represents a total focal length of the projection lens system including the first lens group and the second lens group. f1 represents a focal length of the second lens group. f2 represents a focal length of the first lens group. d8 represents a distance between the first lens group and the second lens group.

Preferably, the second lens group comprises at least one plastic aspherical lens having a positive refractive power.

Preferably, the first lens group comprises at least one plastic aspherical lens having a negative refractive power.

Preferably, the total reflection mirror reflects an incident light so that an angel θ between an optical axis of light transmitted from the first lens group and an optical axis of light transmitted to the second lens group is within 30' through 90°.

Preferably, the total reflection mirror is made of glass of plastics.

Preferably, focusing is performed by moving at least one of the first lens group and the second lens group.

Preferably, focusing is performed by moving a spherical lens included in the second lens and positioned near the total reflection mirror.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
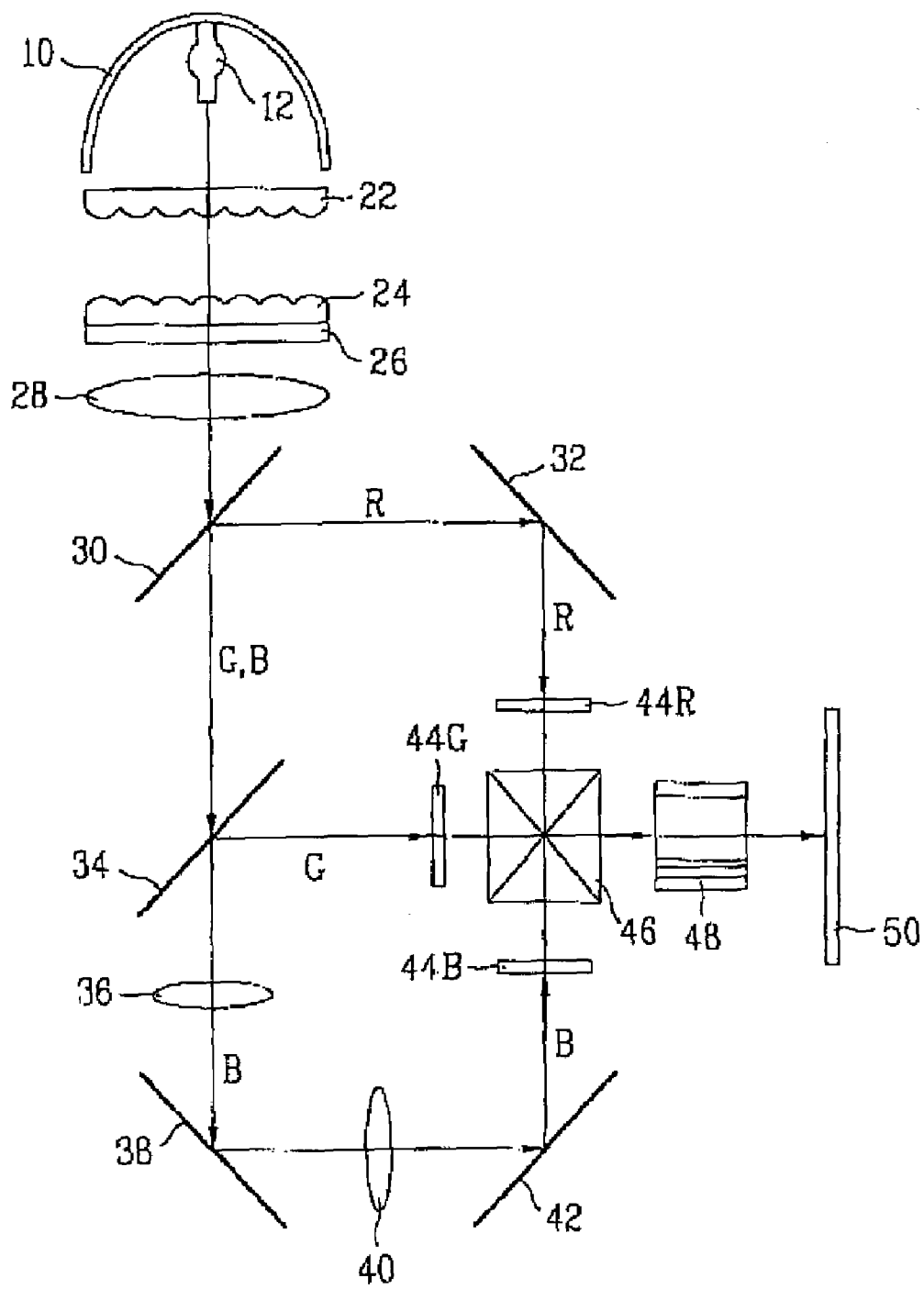
FIG. 1 is a schematic diagram illustrating the related art projection display system based on a liquid crystal panel.
Figure 2:
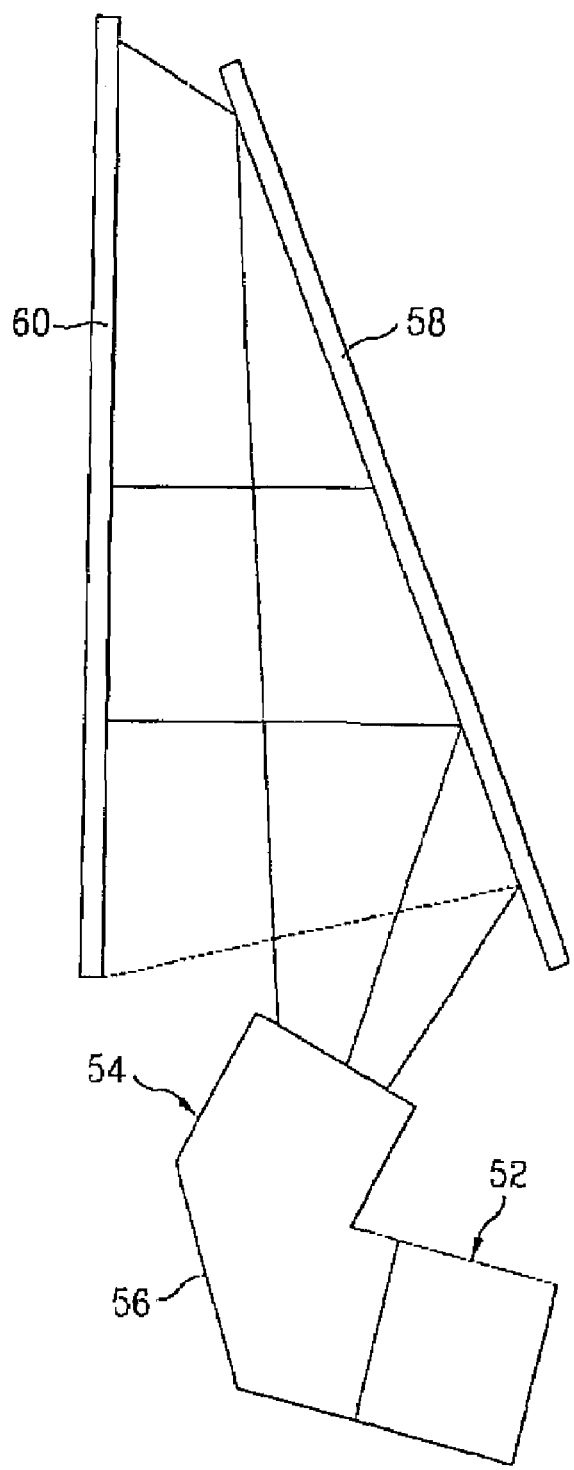
FIG. 2 is a schematic diagram illustrating a structure of an ultra wide angle zoom lens for a projection TV according to an embodiment of the present invention.

FIG. 2 is a schematic diagram illustrating a structure of an ultra wide angle zoom lens for a projection TV according to an embodiment of the present invention.

Referring to FIG. 2, the ultra wide angle zoom lens includes an optical engine 52, a projection lens system 54, a second total reflection mirror 58 and a screen 60. The optical engine 52 includes a liquid crystal panel for reproducing lights transmitted from an illuminating system as an image in accordance with an image signal. The projection lens system 54 includes a first total reflection mirror 56 and enlarges and projects the image from the liquid crystal panel. The second total reflection mirror 58 moves the light path from the projection lens system 54 to the screen 60. In other words, the second total reflection mirror 58 reflects the light image from the liquid crystal panel to thereby send the reflected image to the screen 60. The screen 60 displays the image from the second total reflection mirror 58.

In the optical unit 52, the illuminating system generates and irradiates them onto the liquid crystal panel. At this time, the liquid crystal panel adjusts a transmittance of the lights from the illuminating system in accordance with an image signal to reproduce an image. The projection lens system 54 has an "L" shape by means of the total reflection mirror 56, and enlarges and projects the image from the liquid crystal panel and then displays the resulting image on the screen 60.

Figure 3:
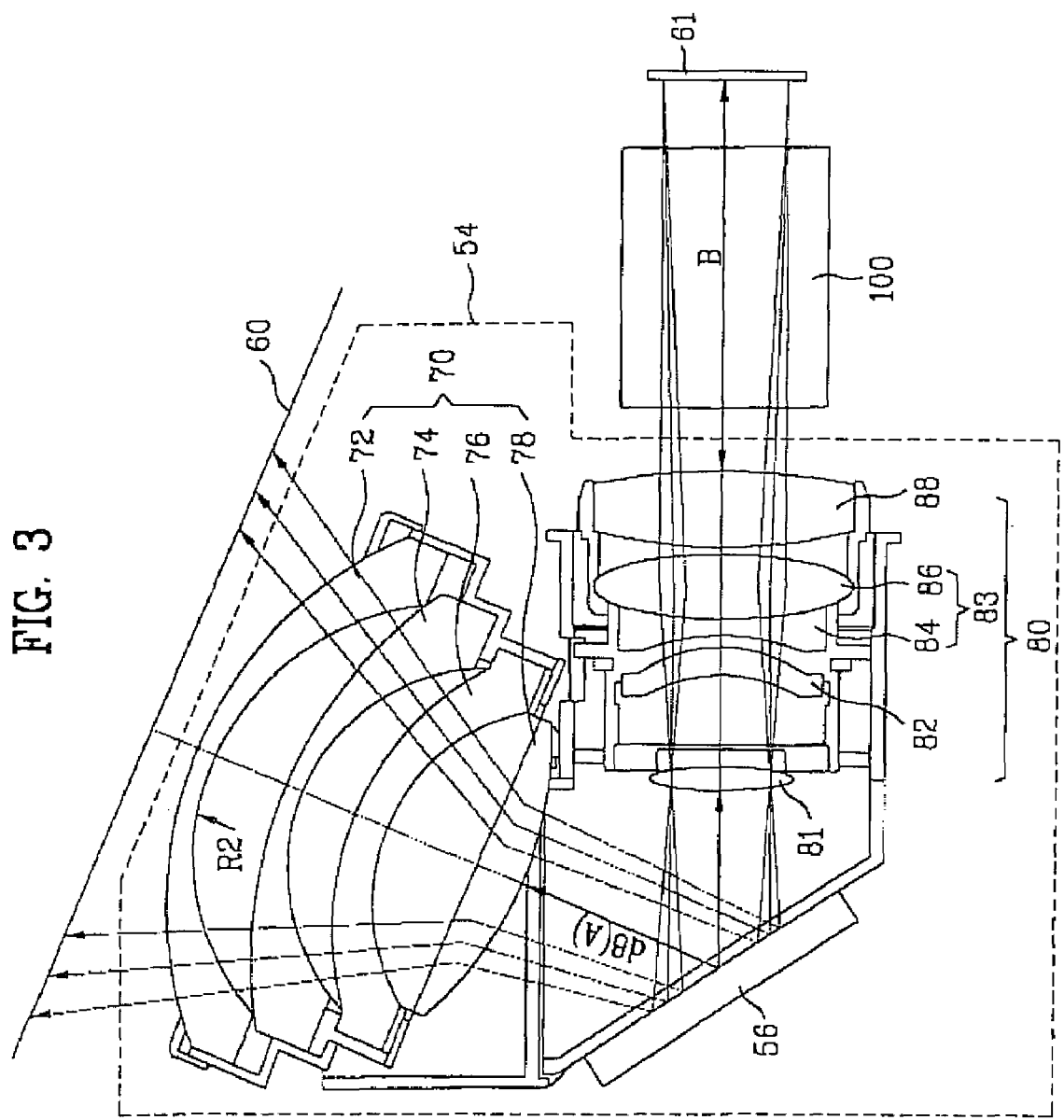
FIG. 3 is a schematic diagram illustrating a projection lens system according to an embodiment of the present invention.

FIG. 3 is a schematic diagram illustrating in detail the projection lens system 54 according to an embodiment of the present invention.

Referring to FIG. 3, the projection lens system 54 includes a liquid crystal panel 61, a first lens group 70 having a negative refractive power, a second lens group 80 having a positive refractive power, and a total reflection mirror 56. The first lens group 70 is arranged between the second lens group 80 and a screen 60. The second lens group 80 is arranged between a prism 100 and the total reflection mirror 56. The second lens group 80 is also arranged between the total reflection mirror 56 and the screen 60.

In accordance with one embodiment of the present invention, the first lens group 70 comprises a first convex lens 72 having a negative refractive power, a second convex lens 74 having a negative refractive power, a plastic aspherical lens 76 having a negative refractive power, and a spherical lens 78 having a positive refractive power. The combination of such lenses allows the first lens group 70 to have an overall negative refractive power. Preferably, edges of the first convex lens 72 contacts edges of the second convex lens 74. Accordingly, distortion and astigmatism of light emitted from the total reflection mirror 56 are corrected.

In accordance with one embodiment of the present invention, the second lens group 80 includes a first spherical lens 81 having a positive refractive power, a plastic aspherical lens 82 having a positive refractive power, a doublet 83 in which a positive spherical lens 84 is coupled with a negative spherical lens 86, and a second spherical lens 88 having a positive refractive power. Preferably, the positive spherical lens 84 and the negative spherical lens 86 of the doublet 83 are cemented together at an interface between the two lenses. Moreover, a lens surface of the positive spherical lens 84 is complementary to an adjacent lens surface of the negative spherical lens 86. The combination of such lenses allows the second lens group 80 to have an overall positive refractive power. Accordingly, chromatic aberration and spherical aberration of incident light from the liquid crystal panel 61 is corrected.

The total reflection mirror 56 changes the direction of the light emitted from the second lens group 80 such that the light is incident on the first lens group 70. In other words, the total reflection mirror 56 reflects the incident light from the second lens group 80 toward the first lens group 70 at a predetermined angle. The predetermined angle is defined as an angle θ between an optical axis of the incident light from the second lens group 80 and an optical axis of light reflected by the total reflection mirror 56 and transmitted to the first lens group 70. Such a predetermined angle is within the range of 30° to 90°. Preferably, the total reflection mirror 56 is made of glass or plastic material. A reflecting surface of the total reflection mirror 56 has a plane shape or aspherical surface shape.

The so-constructed projection lens system 54 is constructed to satisfy the following Equations (1), (2) and (3).

$$3.2 < \frac{bfl}{fl} < 3.5 \quad (1)$$

$$0.75 < \left|\frac{f1}{f2}\right| < 1.0 \quad (2)$$

$$5.0 < \frac{d8}{fl} < 7.0 \quad (3)$$

Here, bfl is a distance between the liquid crystal panel 61 and the second lens group 80. fl represents a total focal length of the projection lens 54 including the first lens group 70 and the second lens group 80. f1 represents a focal length of the second lens group 80. f2 represents a focal length of the first lens group 70. d8 represents a distance between the first lens group 70 and the second lens group 80.

The Equation (1) is directed to a ratio between bfl and fl, i.e., a retro ratio, and determines the size of the projection lens system positioned between the liquid crystal panel 61 and the screen 60.

If the retro ratio has a value of 3.5 or greater, the size of the projection lens system becomes greater. In this case, it is difficult to correct aberrations. On the other hand, if the retro ratio has a value of 3.2 or lower, aberrations can be corrected and better optical characteristics can be obtained, but forming the system is difficult. Accordingly, the value of the retro ratio preferably satisfies the condition of equation (1).

The Equation (2) represents a refractive power of the first lens group 70 and the second lens group 80, and shows a condition for correcting aberration.

If a ratio of f2 to f1 is greater than 1.0, the refractive power of the first lens group 70 becomes weak to thereby facilitate aberration correction. However, when the ratio is greater than 1.0, the distance between the screen 60 and the projection lens system 54 becomes greater. In this case, forming the system with a thin size becomes difficult. Also, if a ratio of f2 to f1 is less than 0.7, the refractive power of the first lens group 70 becomes intense to facilitate a small size and ultra wide optical angle of the projection lens system 54. However, when the ratio is less than 0.7, a surface R2 of the first convex lens 72 in the first lens group 70 comes close to becoming hemispheric. Accordingly, production of the projection lens system becomes difficult. Moreover, astigmatism and image plane curvature occurs. Therefore, the ratio of f2 to f1 preferably satisfies the condition of the equation (2).

The Equation (3) represents whether a total reflection mirror can be arranged between the first lens group 70 and the second lens group 80.

In the Equation (3), if a d8 to fl ratio is less than 5.0, the distance between the first lens group 70 and the second lens groups 80 is small. In this case, it is difficult to arrange the total reflection mirror 56 between the first lens group 70 and the second lens group 80. Also, if a d8 to fl ratio is greater than 7.0, the projection lens system 54 becomes longer. In this case, forming a thin-size system becomes difficult. Accordingly, the d8 to fl ratio preferably satisfies the condition of the equation (3).

Meanwhile, a magnifying power of the projection lens system 54 varies according to movement of the first lens group 70 in the direction of an optical axis. Preferably, the magnifying power is identical to or below 1.1, and can be used on a screen as large as 65 inches without a change in performance.

If the projection lens system 54 focuses an image on the screen by moving the entire lens system, the center of the screen 60 is not adapted to the center of the liquid crystal panel 61. As a result, the image deviates from the screen 60. To avoid deviation of the image, a separate device would be required. However, if such a separate device were implemented, production costs would increases thereby reducing productivity.

To solve such a problem, the projection lens system 54 of the present invention focuses the image on the screen by moving lenses to improve the definition of the image.

In other words, the image is focused on the screen 60 by moving the second lens group 80 or the spherical lens 81 in the second lens group 80. Also, a high definition image can be obtained without deviating from the screen 60.

The Table 1 below shows factors that can be used for design of the projection lens system, such as a curvature radius 'R' of each lens surface, the distance (thickness/air interval) 't' between lens surfaces, and refractive index data of each lens.

In Table 1, the focal length is 1.0 to 1.1 mm, a constant 'Fno' indicating brightness of the projection lens is 2.40, and 2ω is 86.0° to 89.8°, wherein 'ω' represents a picture angle between the projection lens system and the screen.

TABLE 1

| Lens Surface | Curvature Radius(R) | Distance/Air Interval(t) | Refractive Index |
|---|---|---|---|
| S1 | 5.02702 | 0.244013 | 1.63854 |
| S2 | 3.14234 | 0.976051 | |
| S3 | 5.65115 | 0.207863 | 1.48749 |
| S4 | 2.56665 | 2.56665 | |
| S5* | 6.31314 | 0.478988 | 1.490423 |
| S6* | 2.22303 | A | |
| S7 | 2.79738 | 0.304564 | 1.78472 |
| S8 | −4.06688 | 0.144600 | 1.72342 |
| S9 | 6.56123 | 1.071848 | |
| S10* | −2.22235 | 0.360596 | 1.490423 |
| S11* | −1.75771 | 0.063263 | |
| S12 | −2.76548 | 0.144600 | 1.78472 |
| S13 | 2.13918 | 0.929959 | 1.48749 |
| S14 | −2.76548 | 0.045188 | |
| S15 | 6.15635 | 0.520560 | 1.48749 |
| S16 | −8.00904 | 0.045188 | |

TABLE 1-continued

| Lens Surface | Curvature Radius(R) | Distance/Air Interval(t) | Refractive Index |
|---|---|---|---|
| S17 | 17.62675 | 0.736557 | 1.48749 |
| S18 | −3.06371 | B | |
| S19 | Image Plane | 0.0 | |

Here, '*' represents a non spherical lens.

Here, '*' represents a non-spherical lens.

Aspherical surface factors determining aspherical lens surfaces S5, S6, S10 and S11 shown in Table 1 are defined by the following Equation (4).

$$X(r) = \frac{cr^2}{1+(1-Kc^2r^2)^{1/2}} + a_1 \cdot r^4 + a_2 \cdot r^6 + a_3 \cdot r^8 + \cdots \quad (4)$$

Here, '$X(r)$' is a Seg value about an aspherical surface at a point having a height '$r$' from an optical axis, '$c$' is a curvature of a lens surface at an optical axis, '$K$' is a conic constant and $a_1$, $a_2$, $a_3$, $a_4$ are aspherical coefficients.

Also, coefficients regarding shapes of aspherical lens surfaces are shown in Table 2 below.

TABLE 2

| Lens surface | S5 | S6 | S10 | S11 |
|---|---|---|---|---|
| K | 4.385768 | −1.224032 | 0.527298 | −0.227697 |
| $a_1$ | 0.198825E−01 | 0.257097E−01 | −0.154300E−01 | 0.863611E−02 |
| $a_2$ | −0.367529E−02 | −0.491804E−02 | −0.559249E−02 | −0.683278E−02 |
| $a_3$ | 0.501434E−03 | 0.488546E−03 | 0.358626E−01 | 0.259979E−01 |
| $a_4$ | −0.349963E−04 | −0.730355E−04 | −0.223921E−01 | −0.159435E−01 |

By differently adjusting intervals (thickness/air interval) between respective lens surfaces through movement of lens surfaces S6 and S18 respectively expressed as A and B in Table 1, focal lengths of fields at a wide angle, middle, and tele points can be expressed as Table 3 below.

TABLE 3

| Focal distance (f) | A | B |
|---|---|---|
| Fw | 7.092083 | 3.432255 |
| Fm | 6.998330 | 3.422244 |
| Ft | 6.755535 | 3.396386 |

Here, 'Fw' represents a focal length of a field at a wide angle point, 'Fm' represents a focal length of a field at a middle point and 'Ft' represents a focal length of a field at a tele point.

FIGS. 4 through 6 are graphs illustrating aberration characteristics of the projection lens system at a wide angle, middle, and tele points with reference to Table 3.

Figure 4A:
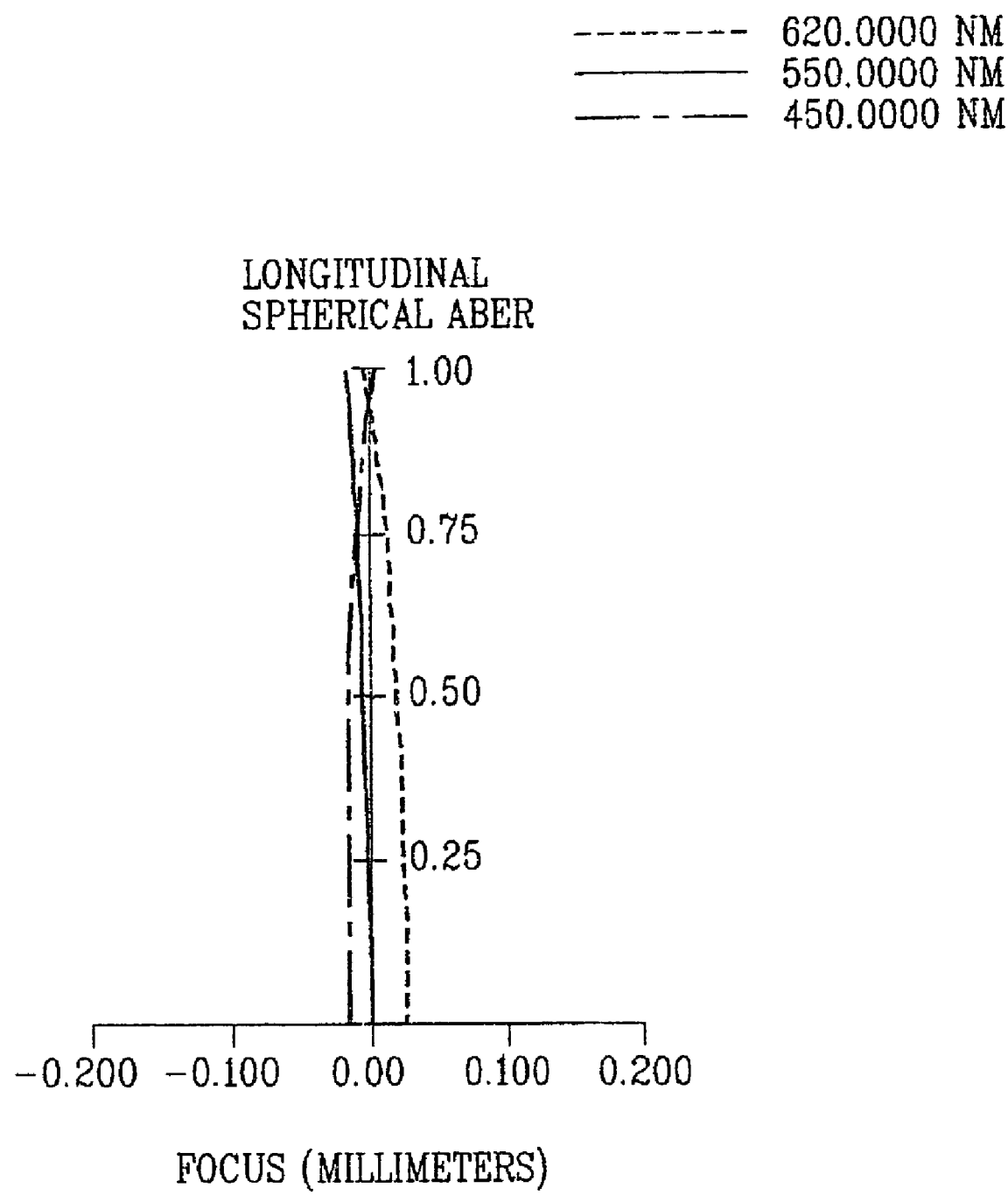
FIGS. 4A, 5A and 6A are graphs illustrating spherical aberration characteristics of the projection lens according to an embodiment of the present invention.
Figure 5A:
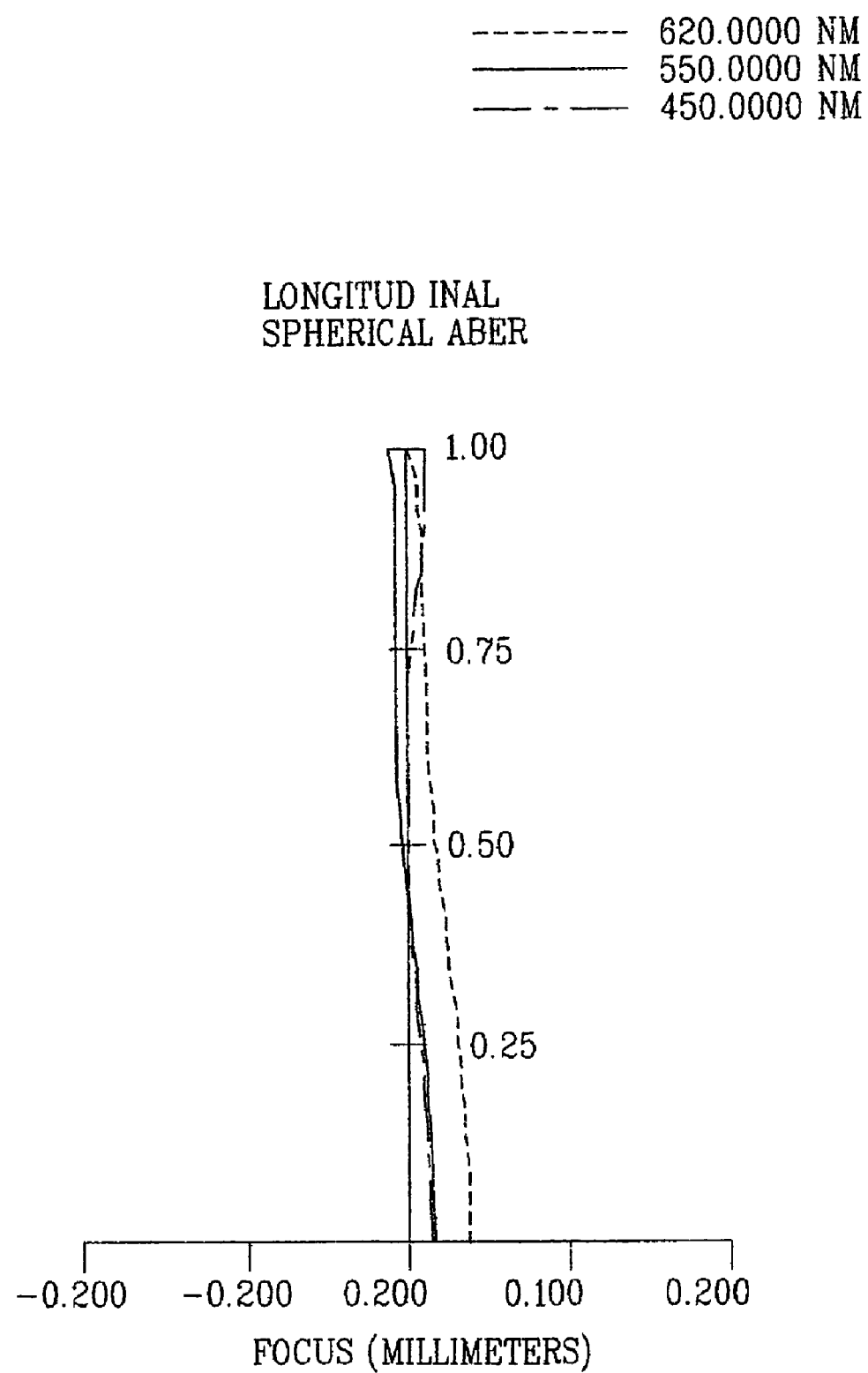
Figure 6A:
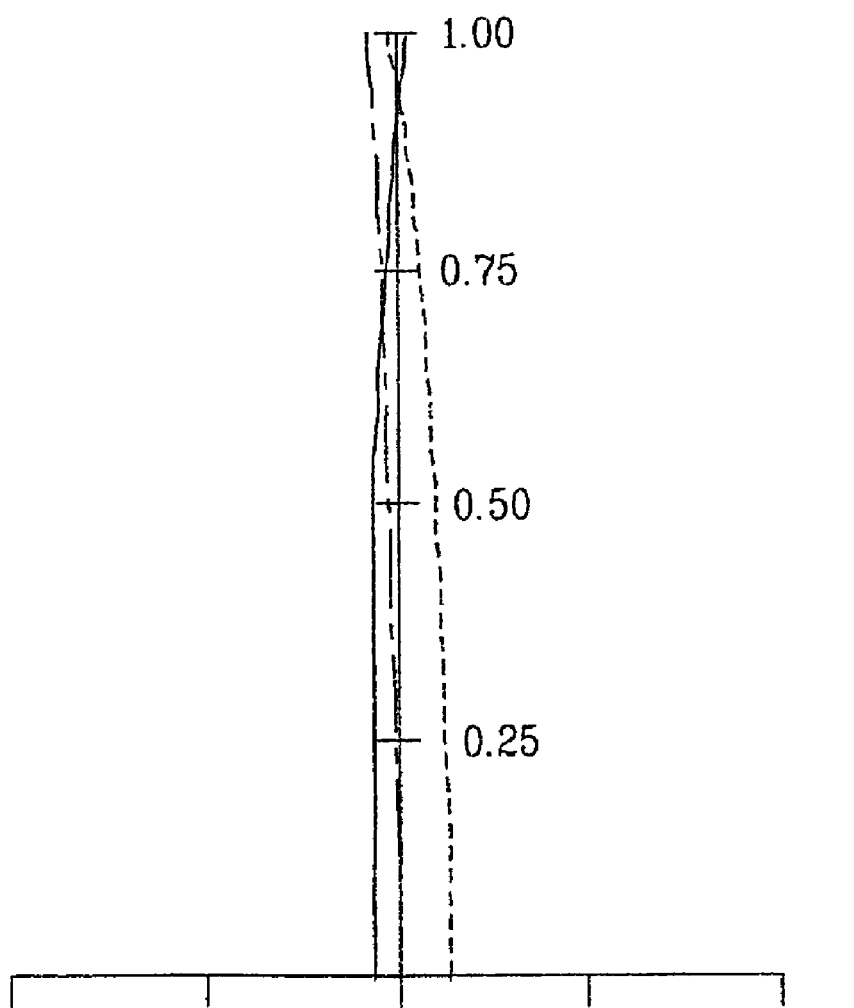

FIGS. 4A, 5A and 6A are graphs illustrating spherical aberration characteristics of the projection lens according to an embodiment of the present invention. Referring to FIGS. 4A, 5A and 6A, a value of a spherical aberration varies depending on the height of the focused plane, and the range of spherical aberrations deviating from the focus of the projection lens system is about +0.5 mm through −0.3 mm.

Figure 4B:
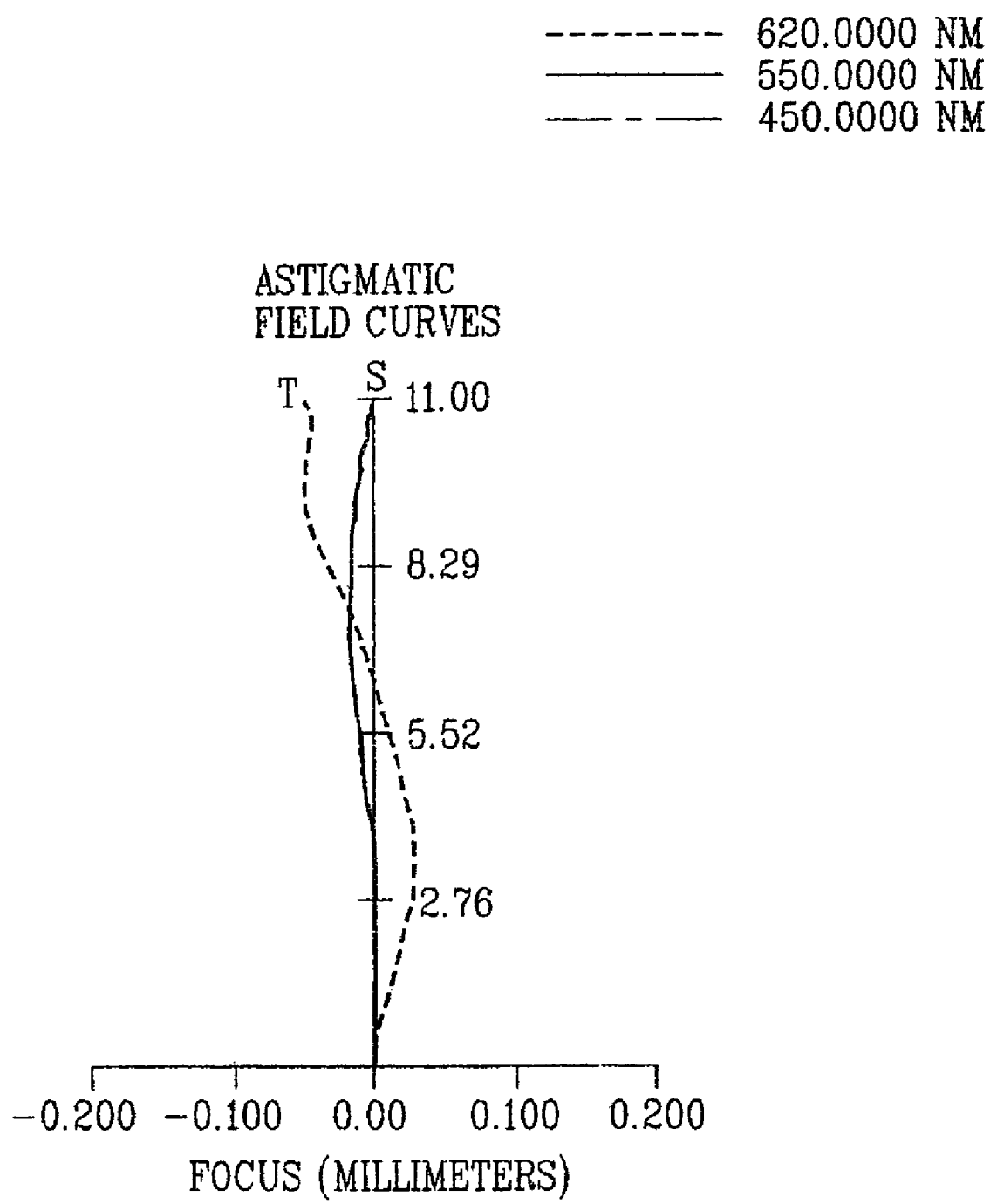
FIGS. 4B, 5B and 6B are graphs illustrating image plane curvature characteristics (astigmatic field curves) of the projection lens according to an embodiment of the present invention.
Figure 5B:
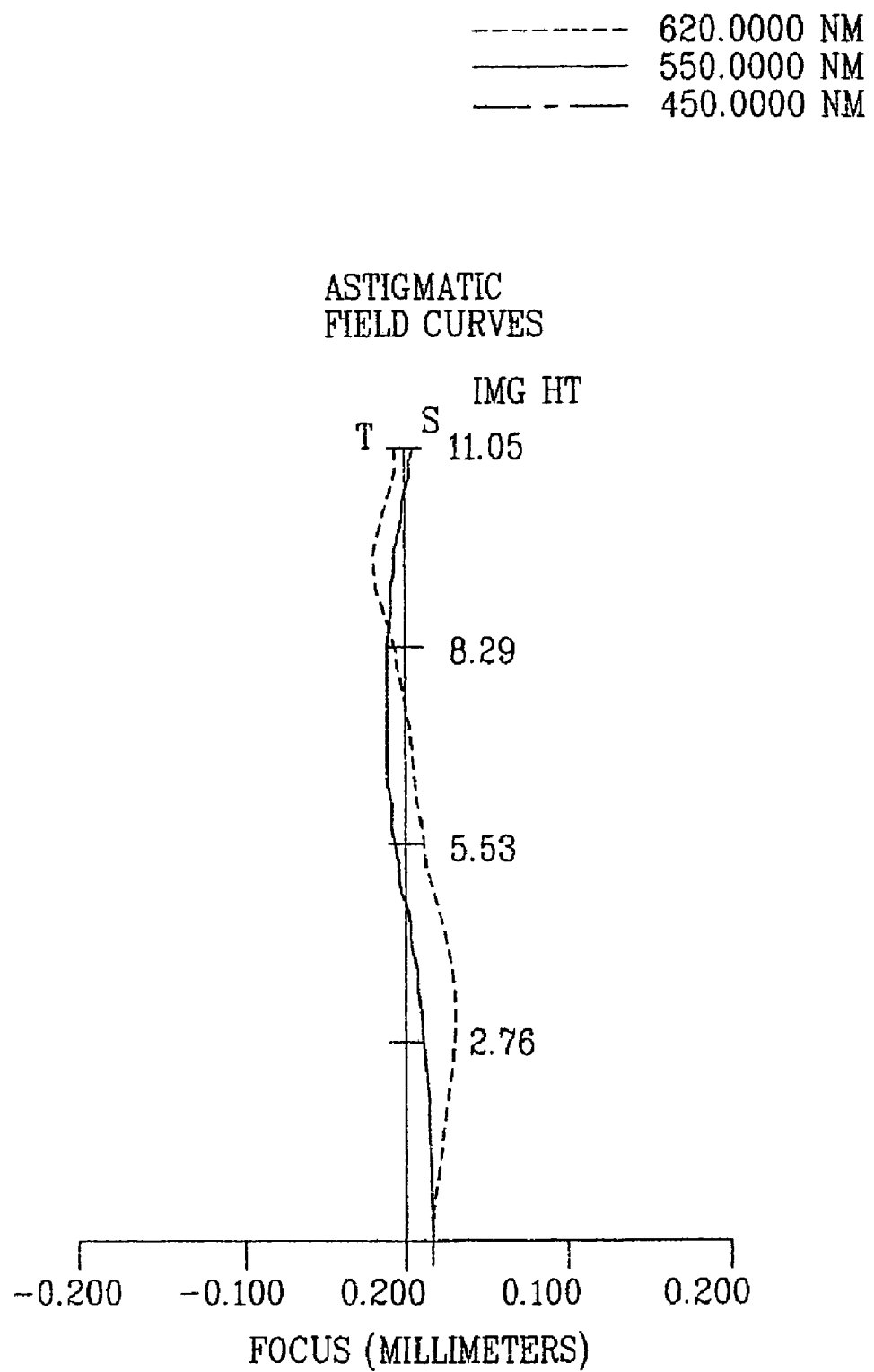
Figure 6B:
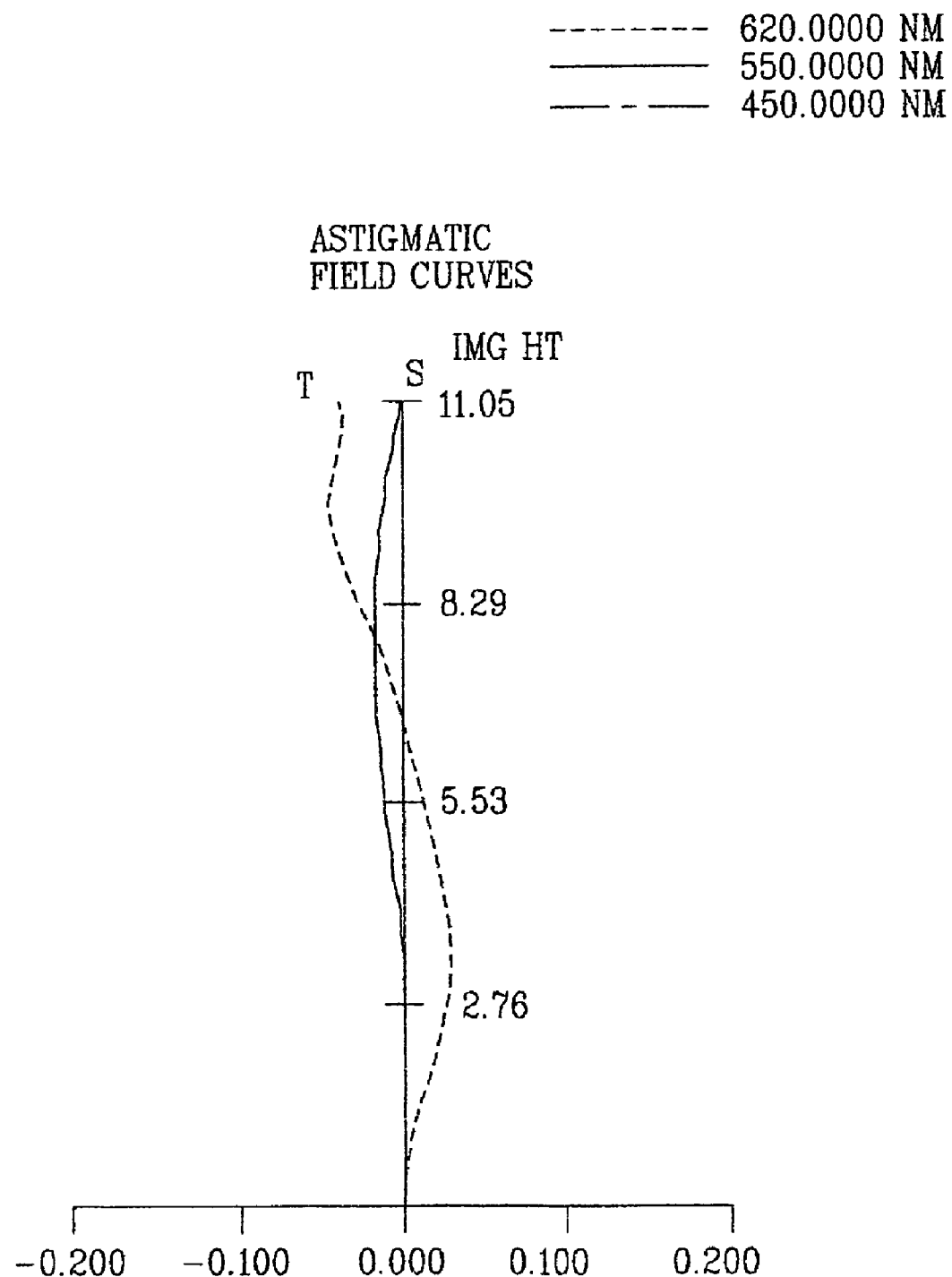

FIGS. 4B, 5B and 6B are graphs illustrating image plane curvature characteristics of the projection lens according to an embodiment of the present invention. Referring to FIGS. 4B, 5B and 6B, image plane curvature varies depending on the height of the focused plane, and the range of image plane curvature deviating from the focus of the projection lens system is about +0.02 mm through −0.5 mm.

Figure 4C:
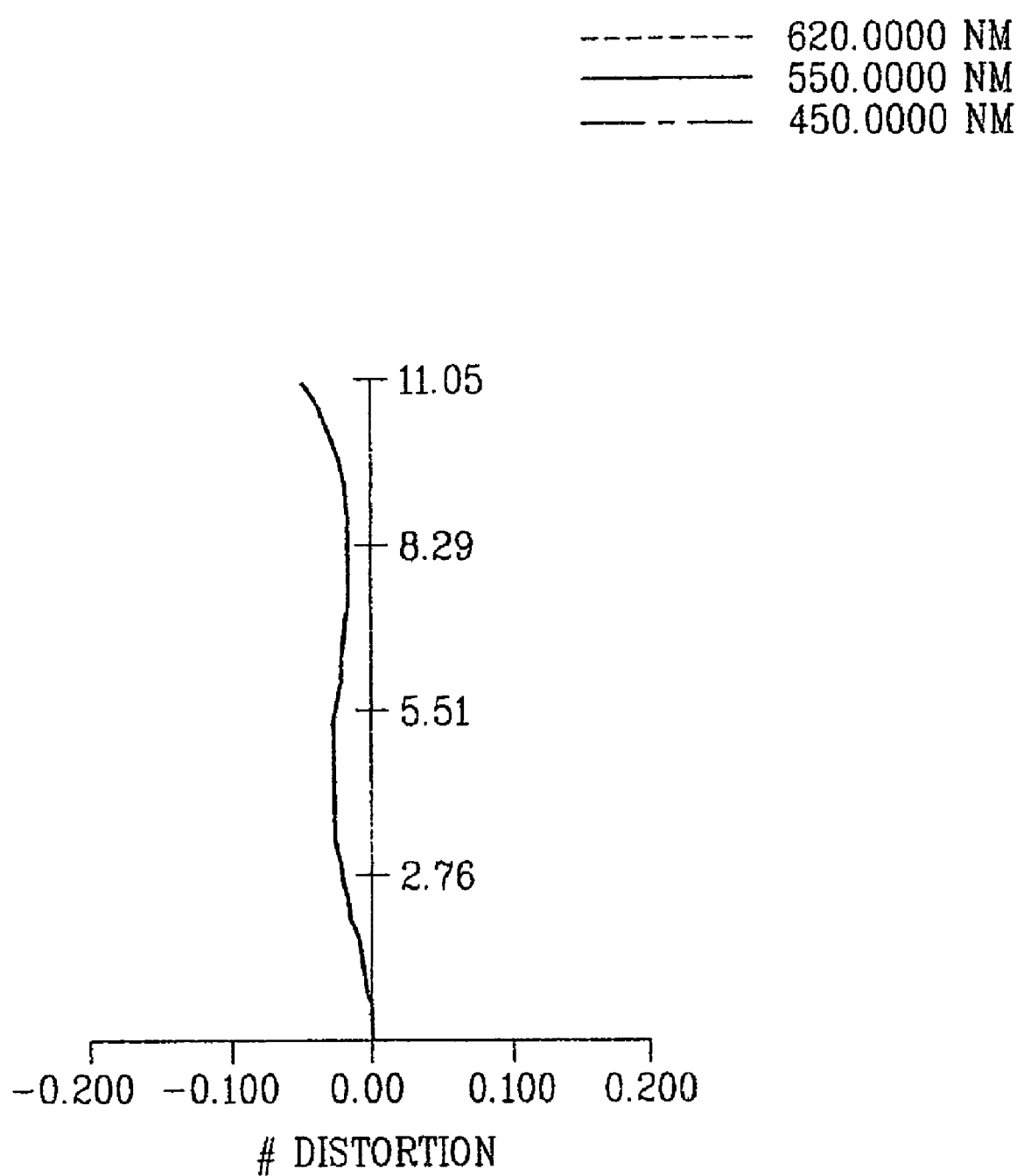
FIGS. 4C, 5C and 6C are graphs illustrating distortion characteristics of the projection lens according to an embodiment of the present invention.
Figure 5C:
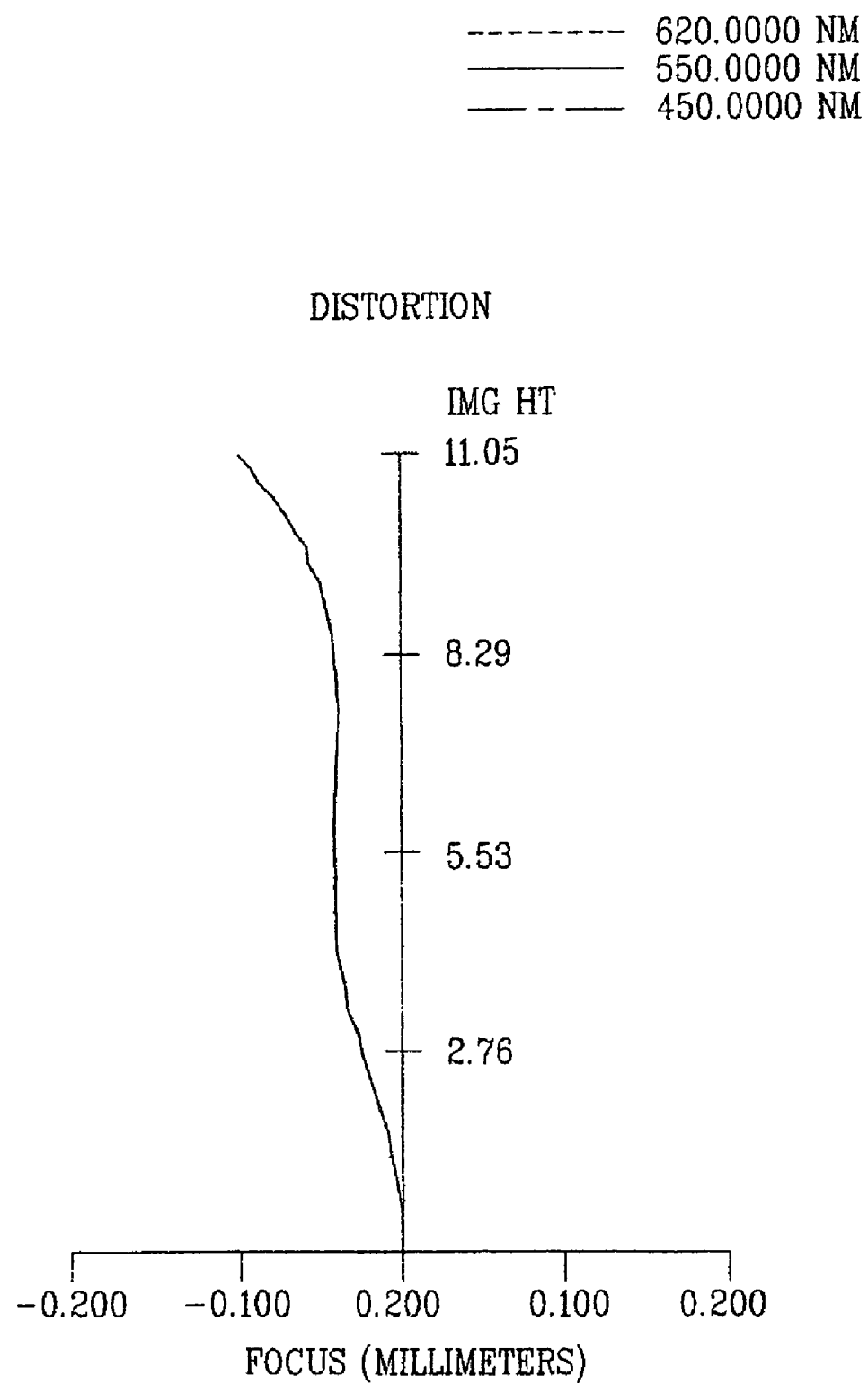
Figure 6C:
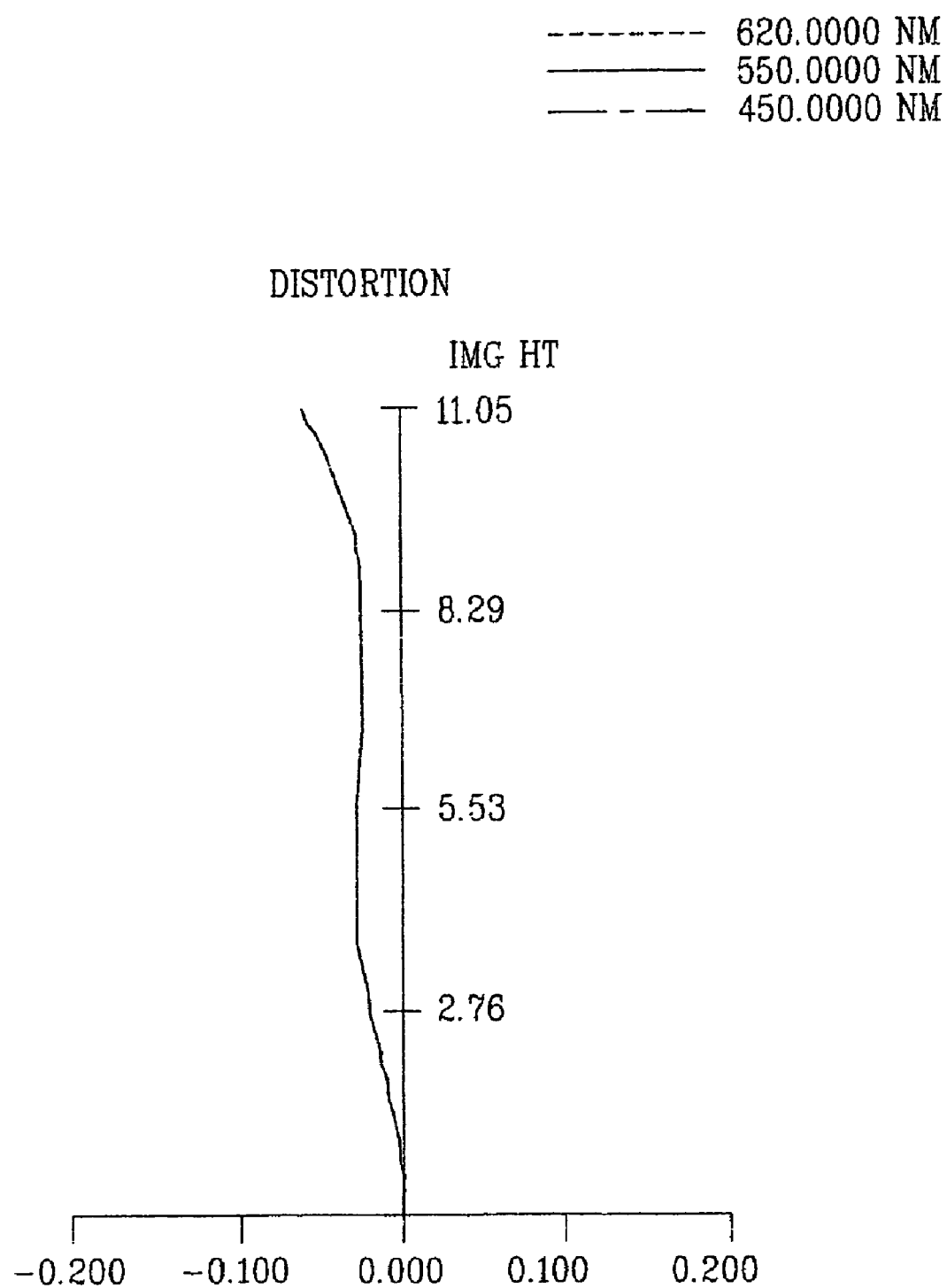

FIGS. 4C, 5C and 6C are graphs illustrating distortion characteristics of the projection lens according to an embodiment of the present invention. Referring to FIGS. 4C, 5C and 6C, distortion varies depending on the height of the focused plane. As the height increases, the distortion increases. The range of distortion deviating from the focus of the projection lens system is about +0.0 mm through −1.5 mm.

Contrary to the prior art aberration characteristic, the aberration characteristic of the projection lens system according to the present invention corrects a spherical aberration, image plane curvature, and distortion, thereby realizing a high performance of the projection lens system.

As described above, the ultra wide angle zoom lens in the projection display system according to the present invention has the following advantages.

First, the present invention defines the size of the projection lens system that can be installed between a liquid crystal panel and a screen, thereby making it possible to correct a spherical aberration, image plane curvature, and astigmatism.

Secondly, the present invention can realize a clear picture by moving a lens or a lens group constructing the projection lens system.

Thirdly, the present invention can be adopted in the rear projection TV using sFPD as a device, facilitate a slimness and lightweight system, and has a magnification-changing function in the projection lens so as to cope with a variation in a screen size.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A projection display system, comprising:
an illuminating system generating a light;
an optical engine displaying an image according to an image signal; and
a projection lens system enlarging the image transmitted from the optical engine and projecting the enlarged imaged on a screen,
wherein the projection lens system comprises a first lens group having a negative refractive power, a second lens group having a positive refractive power and a total reflection mirror arranged between the first lens group and the second lens group,
wherein the arrangement of the first lens group, the second lens group and the total reflection mirror satisfies the following conditions:

$3.2 < bfl/fl < 3.5,$ $0.75 < |f2/f1| < 1.0,$ and $5.0 < d8/fl < 7.0,$ wherein bfl represents a distance between the optical engine and the second lens group, fl represents a total focal length of the projection lens system, f1 represents a focal length of the second lens group, f2 represents a focal length of the first lens group, and d8 represents a distance between the first lens group and the second lens group.

2. The projection display system of claim 1, wherein a focal point of the projection lens system is changed by moving at least any one lens in the second lens group, and a magnification of the projection lens system is changed by moving the first lens group.

3. The projection display system of claim 1, wherein the second lens group comprises:
   a first spherical lens positioned near the first total reflection mirror and having a positive refractive power;
   a non-spherical lens positioned near the first spherical lens and having a positive refractive power;
   a doublet positioned near the non-spherical lens, wherein the doublet comprises a first sub-lens and a second sub-lens, the first sub-lens coupled to the second sub-lens; and
   a second spherical lens positioned near the doublet and having a positive refractive power.

4. The projection display system of claim 1, wherein the first lens group comprises:
   a spherical lens positioned near the total reflection mirror and having a positive refractive power;
   a non-spherical lens and having a negative refractive power; and
   first and second convex lenses arranged near non-spherical lens and having a negative refractive power.

5. The projection display system of claim 4, wherein a portion of the first convex lens contacts a portion of the second convex lens, and a portion of the second convex lens contacts a portion of the non-spherical lens.

6. The projection display system of claim 1, wherein refractive powers of the first and second lens groups are determined so that a focal length ratio of the first lens group to the second lens group is within 0.7 through 1.0.

7. The projection display system of claim 1, wherein the first lens group and the second lens group are made of glass or plastics.

8. The projection display system of claim 1, wherein the first total reflection mirror reflects an incident light so that an angel θ between an optical axis of light transmitted from the first lens group and an optical axis of light transmitted to the second lens group is within 30° trough 90°.

9. The projection display system of claim 1, wherein the first total reflection mirror is made of glass or plastics.

10. The projection display system of claim 1, wherein a reflection surface of the total reflection mirror is plane or non-spherical.

11. An ultra wide angle zoom lens in a projection display system, comprising:
    a liquid crystal panel displaying an image;
    a first lens group having a negative refractive power, formed by combination of two or more lenses, and correcting distortion and astigmatism of incident light from a total reflection mirror; and
    a second lens group having a positive refractive power, formed by combination of two or more lenses, and correcting chromatic and spherical aberrations of incident light from the liquid crystal panel,
    wherein the total reflection mirror reflects the incident light from the second lens group in a predetermined direction,
    wherein the arrangement of the first lens group, the second lens group and the total reflection mirror satisfies the following conditions:

$3.2 < bfl/fl < 3.5,$ $0.75 < |f2/f1| < 1.0,$ and $5.0 < d8/fl < 7.0,$ wherein bfl represents a distance between the liquid crystal panel and the second lens group, fl represents a total focal length of the ultra wide angle zoom lens including the first lens group and the second lens group, f1 represents a focal length of the second lens group, f2 represents a focal length of the first lens group, and d8 represents a distance between the first lens group and the second lens group.

12. The ultra wide angle zoom lens of claim 11, wherein the second lens group comprises at least one plastic non-spherical lens having a positive refractive power.

13. The ultra wide angle zoom lens of claim 11, wherein the first lens group comprises at least one plastic non-spherical lens having a negative refractive power.

14. The ultra wide angle zoom lens of claim 11, wherein the total reflection mirror reflects an incident light so that an angle θ between an optical axis of light transmitted from the first lens and an optical axis of light transmitted to the second lens group is within 30° through 90°.

15. The ultra wide angle zoom lens of claim 11, wherein the total reflection mirror is made of glass or plastics.

16. The ultra wide angle zoom lens of claim 11, wherein a reflection surface of the total reflection mirror is plane or non-spherical.

17. The ultra wide angle zoom lens of claim 11, wherein a focal point of the second lens group is changed by moving at least any one lens in the second lens group.

18. The ultra wide angle zoom lens of claim 11, wherein a focal point of the second lens group is changed by moving a spherical lens included in the second lens group.

* * * * *